(12) United States Patent
Chang

(10) Patent No.: US 7,213,621 B1
(45) Date of Patent: May 8, 2007

(54) OIL CHANGE EQUIPMENT

(75) Inventor: Min-Chung Chang, Tainan (TW)

(73) Assignee: Yung Yen Hsin Ind. Co., Ltd., Tainan (TW)

( * ) Notice: Subject to any disclaimer, the term of this patent is extended or adjusted under 35 U.S.C. 154(b) by 0 days.

(21) Appl. No.: 11/290,585

(22) Filed: Dec. 1, 2005

(51) Int. Cl.
*B65B 1/04* (2006.01)
*F16N 31/00* (2006.01)

(52) U.S. Cl. .................. 141/86; 184/1.5; 184/106; 141/297; 141/301; 141/338; 141/88

(58) Field of Classification Search ............ 141/8, 141/65, 86, 88, 98, 297, 301, 338; 184/1.5, 184/106; 137/581, 585, 590
See application file for complete search history.

(56) References Cited

U.S. PATENT DOCUMENTS

| | | | | |
|---|---|---|---|---|
| 1,994,844 A | * | 3/1935 | Vahle et al. ............... | 184/1.5 |
| 4,638,841 A | * | 1/1987 | Heath ....................... | 141/98 |
| 5,062,500 A | * | 11/1991 | Miller et al. ............... | 184/106 |
| 5,074,380 A | * | 12/1991 | Bedi et al. ................. | 184/1.5 |
| 5,301,724 A | * | 4/1994 | Maxwell .................... | 141/98 |
| 5,381,839 A | * | 1/1995 | Dowd ........................ | 141/242 |
| D395,439 S | * | 6/1998 | King et al. ................. | D15/150 |
| 5,921,262 A | * | 7/1999 | Campbell ................... | 137/1 |

* cited by examiner

*Primary Examiner*—Timothy L. Maust
(74) *Attorney, Agent, or Firm*—Rosenberg, Klein & Lee

(57) ABSTRACT

An oil change equipment includes an oil barrel, an oil-collecting pan, and a vacuum oil-pumping device; the oil barrel has an inlet thereon, and a control valve connected thereto; an oil conduit is joined to the oil inlet of the oil barrel at one end, and connected to a pipe communicating with a containing space in the oil-collecting pan; a supporting rod is secured on top of the oil barrel; the vacuum oil-pumping device is connected to the control valve of the oil barrel; therefore, the oil collecting pan can be supported on the upper end of the supporting rod secured on top of the oil barrel, thus allowing drained oil received in the oil collecting pan to flow into the oil barrel directly; or alternatively, the oil collecting pan can be positioned apart from the supporting rod to receive drained oil.

2 Claims, 6 Drawing Sheets

OIL CHANGE EQUIPMENT

BACKGROUND OF THE INVENTION

1. Field of the Invention

The present invention relates to an oil change equipment, more particularly one, which includes an oil barrel, an oil-collecting pan, and an conduit communicating with the insides of the oil barrel and the oil-collecting pan, thus allowing drained oil received with the pan to flow into the oil barrel directly and allowing drained oil in the pan to be directly drawn into the oil barrel.

2. Brief Description of the Prior Art

A conventional oil change equipment, which is used for receiving drained oil in oil change, includes an oil barrel, a hollow supporting rod secured on top of the oil barrel, an oil-collecting pan supported on an upper end of the hollow supporting rod. The hollow supporting rod communicates with both the insides of the oil barrel and the oil-collecting pan. In changing oil of a small vehicle, first the vehicle is lifted off the ground with a jack, and next the oil change equipment is moved so that the oil-collecting pan is right under the oil outlet of the vehicle; thus, oil drained from the vehicle will flow into the oil barrel directly through the oil-collecting pan. However, the oil change equipment can't be used in changing oil of a large vehicle because a large vehicle can't be lifted with a jack, and because the oil change equipment is too heavy and large to be moved into and out of a repair pit in a garage; in changing oil, first a person drives the vehicle to such a position so that the oil outlet of the vehicle is right above a repair pit, and next he positions a collecting pan in the repair pit and right under the oil outlet to received oil drained from the vehicle, and finally he takes the collecting pan out of the repair pit and pours the oil into an oil barrel. However, while the collecting pan is being moved from the repair pit to the oil barrel, the oil is prone to spill out of the collecting pan, and make the ground very greasy and slippery, causing a lot of inconvenience.

SUMMARY OF THE INVENTION

It is a main object of the invention to provide an improvement on an oil change equipment to overcome the above-mentioned problem. The oil change equipment of the present invention includes an oil barrel, an oil-collecting pan, and a vacuum oil-pumping device. The oil barrel has an inlet thereon, and a control valve connected thereto. And, an oil conduit is joined to the oil inlet at one end, and connected to a pipe communicating with a containing space in the oil-collecting pan. The oil barrel has a supporting rod secured on an upper side thereof. The vacuum oil-pumping device is connected to the control valve of the oil barrel. Therefore, the oil collecting pan can be supported on the upper end of the supporting rod secured on top of the oil barrel, thus allowing drained oil received in the oil collecting pan to flow into the oil barrel directly. Or alternatively, the oil collecting pan can be positioned apart from the supporting rod to receive drained oil, which will be directly drawn into the oil barrel with the vacuum oil-pumping device.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
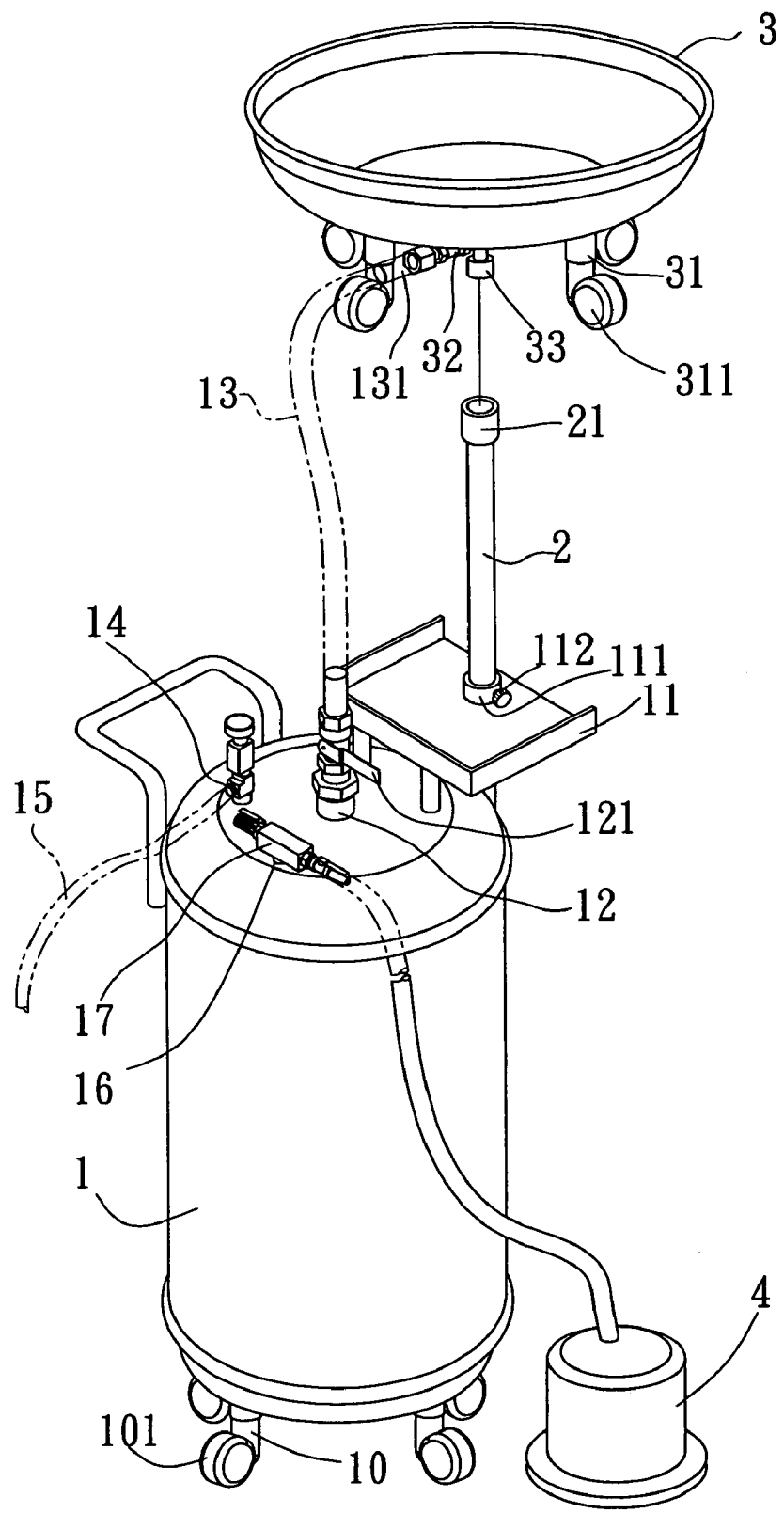
FIG. 1 is a perspective view of the first preferred embodiment of an oil change equipment in the present invention.
Figure 2:
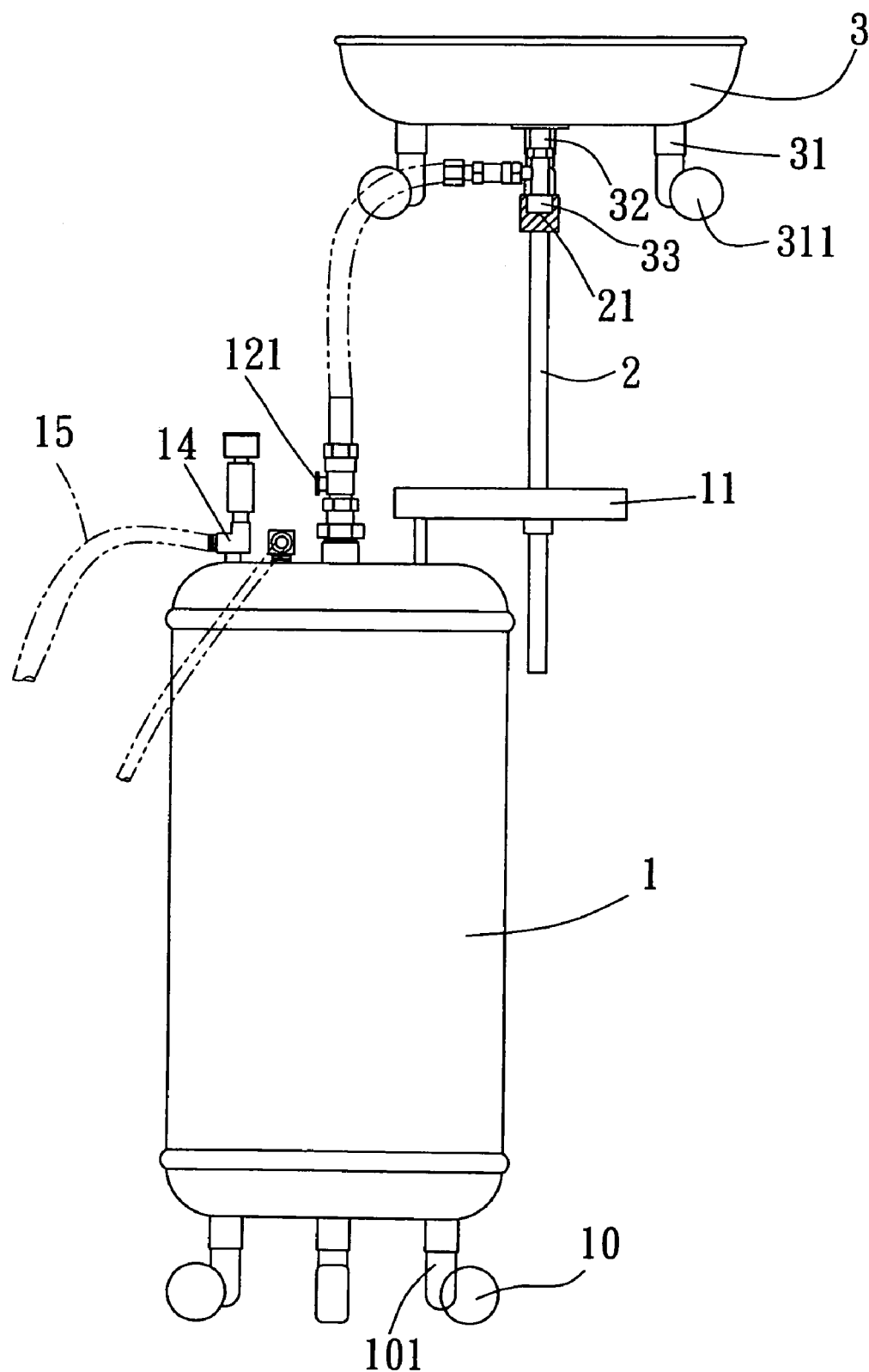
FIG. 2 is a lateral sectional view of the first preferred embodiment.
Figure 4:
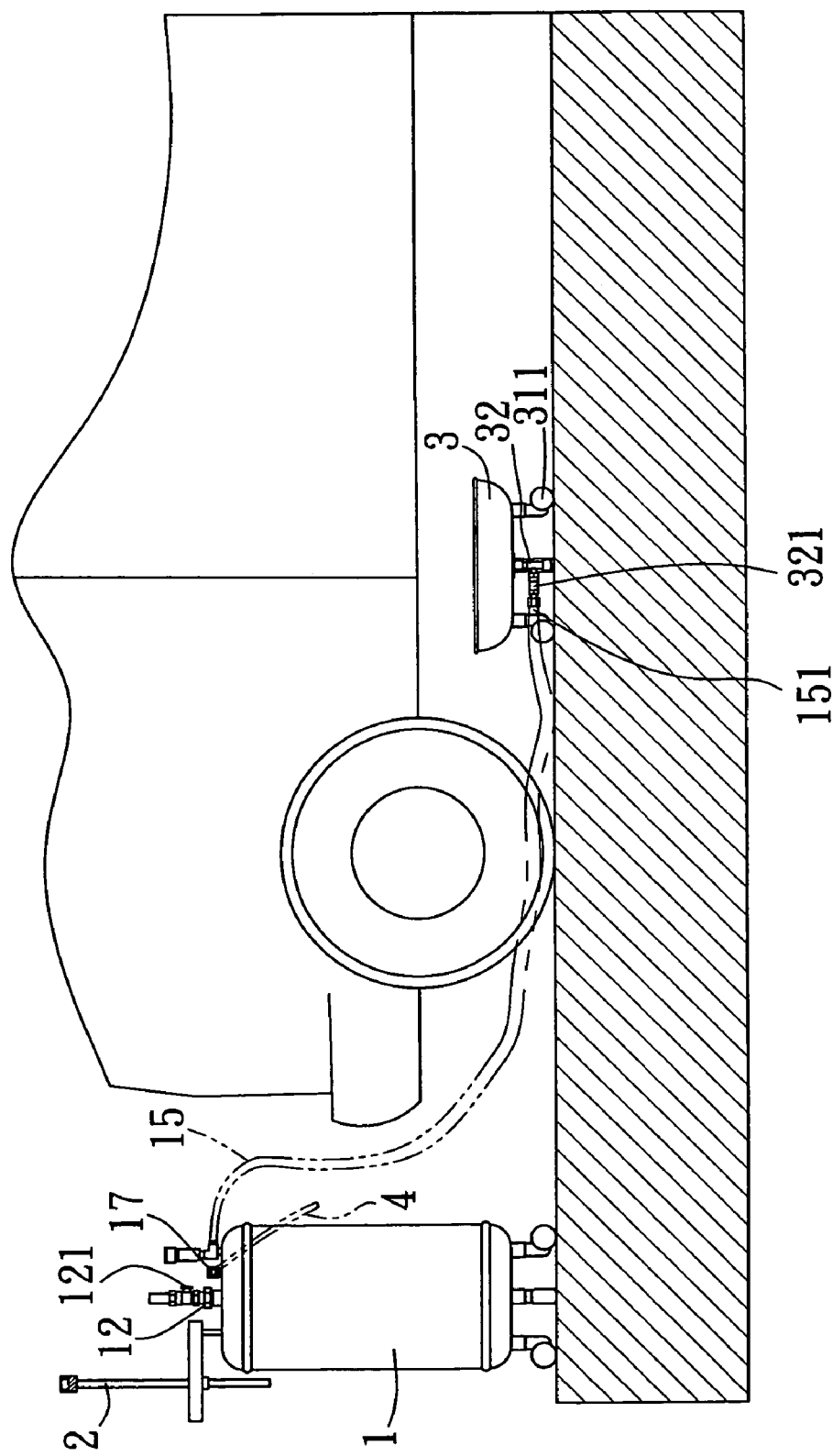
FIG. 4 is a view of the first preferred embodiment in use (2)

Referring to FIGS. 1, 2, and 4, a first preferred embodiment of an oil change equipment in the present invention includes:

an oil barrel 1; the oil barrel 1 has several supporting parts 10 secured on a bottom thereof, casters 101 joined to respective ones of the supporting parts 10, an oil inlet 12 on an upper side, a control valve 121 securely joined to the oil inlet 12, a second oil inlet 14, a gate 16 on the upper side thereof, and a control valve 17 securely joined to the gate 16;

an oil conduit 13; the oil conduit 13 is securely joined to the control valve 121 of the oil barrel 1 at one end, and it is equipped with a coupling 131 at the other end;

an oil conduit 15; the oil conduit 15 is securely joined to the second oil inlet 14 of the oil barrel 1 at one end, and it is equipped with a coupling 151 at the other end; the oil conduit 15 is longer than the oil conduit 13;

a holding tray 11 supported on an upper end of the oil barrel 1; the holding tray 11 has a sleeve 111 secured in an upright position thereon, and a fixing element 112 is passed through a lateral side of the sleeve 111;

a supporting rod 2; the supporting rod 2 is inserted in the sleeve 111 of the holding tray 11 at a lower end thereof, and secured in position by means of making the fixing element 112 tightly pressed against the lower end of the supporting rod 2; the supporting rod 2 has a hollow seat 21 at an upper end thereof;

an oil-collecting pan 3; the oil collecting pan 3 has several supporting parts 31 on the bottom, and casters 311 joined to respective ones of the supporting parts 31;

a pipe 32; the pipe 32 is joined to a bottom of the oil collecting pan 3 at one end, and communicates with the containing space in the oil collecting pan 3; the pipe 32 is equipped with a coupling 321 at the other end for connection to either of the couplings 131 and 151; the pipe 32 has a connecting pivot 33 secured on a bottom side thereof; and a vacuum oil-pumping device 4 connected to the control valve 17 of the oil barrel 1; the vacuum oil-pumping device 4 can be a pneumatic and vacuum oil-pumping device, a pneumatic pump, a pneumatic motor or an electric motor.

Figure 3:
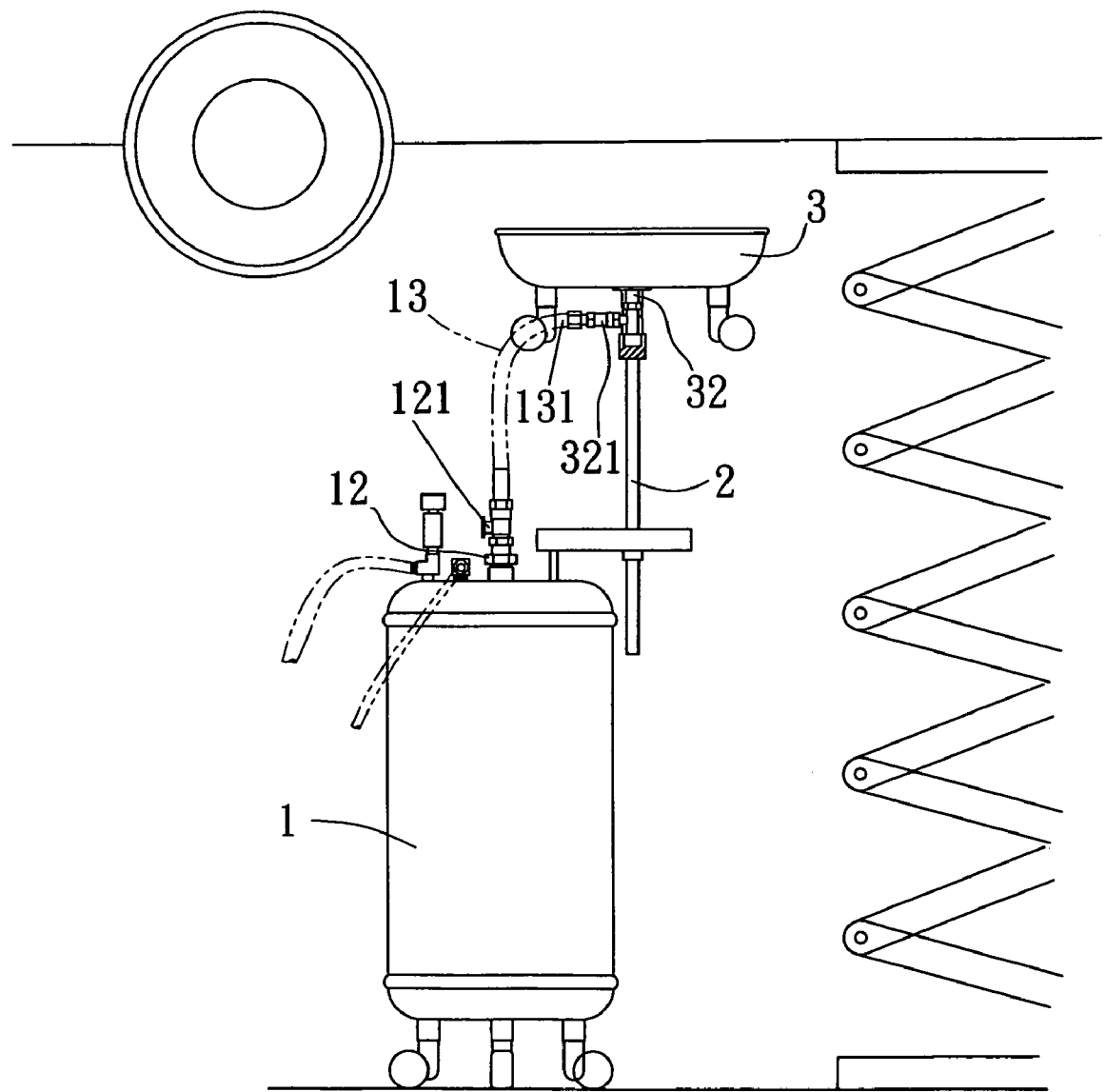
FIG. 3 is a view of the first preferred embodiment in use (1)

Referring to FIG. 3, when the user wants to drain used oil from a small vehicle, first he lifts the small vehicle off the ground with a jack, and inserts the connecting pivot 33 into the hollow seat 21 so as to support the oil collecting pan 3 on top of the supporting rod 2, and next he moves the oil change equipment of the present invention so that the oil collecting pan 3 is right under the oil outlet of the vehicle. And, the coupling 321 of the pipe 32 is connected to the coupling 131 of the oil conduit 13, and the control valve 121 on the oil barrel 1 is opened. Therefore, used oil drained from the vehicle into the oil collecting pan 3 will flow into the oil barrel 1 directly through the oil conduit 13.

Referring to FIG. 4, when the user wants to drain used oil from a large vehicle that can't be lifted by means of a jack, first he connects the coupling 321 of the pipe 32 to the coupling 151 of the oil conduit 15 instead of the coupling 131 of the oil conduit 13, and separates the oil collecting pan 3 from the supporting rod 2, and pushes the oil collecting pan 3 supported on the casters 311 to under the oil outlet of the large vehicle. Next, the control valve 121 on the oil barrel 1 is closed, and the control valve 17 opened, and the vacuum oil-pumping device 4 is activated to produce a negative pressure inside the oil barrel 1. Therefore, used oil drained from the vehicle into the oil collecting pan 3 will be directly drawn into the oil barrel 1.

Figure 5:
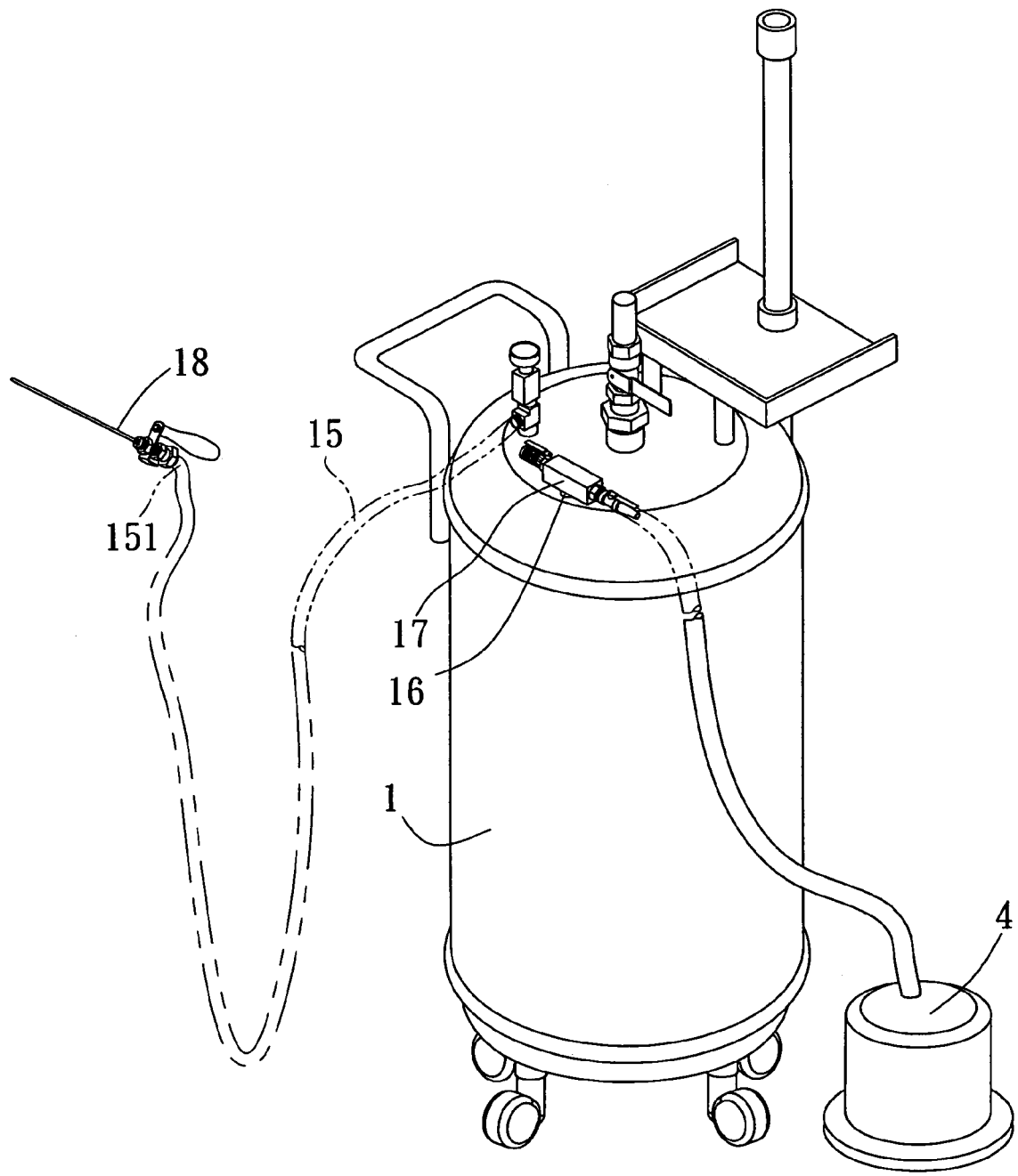
FIG. 5 is a view of the first preferred embodiment in use (3)

Furthermore, referring to FIG. 5, when the user wants to drain used oil from a motorcycle, a straw 18 is connected to the coupling 151 of the oil conduit 15, and inserted in the oil chamber of a motorcycle, and the vacuum oil-pumping device 4 is activated to produce a negative pressure inside the oil barrel 1. Therefore, the used oil will be directly drawn from the oil chamber of the motorcycle into the oil barrel 1 through both the straw 18 and the oil conduit 15.

Figure 6:
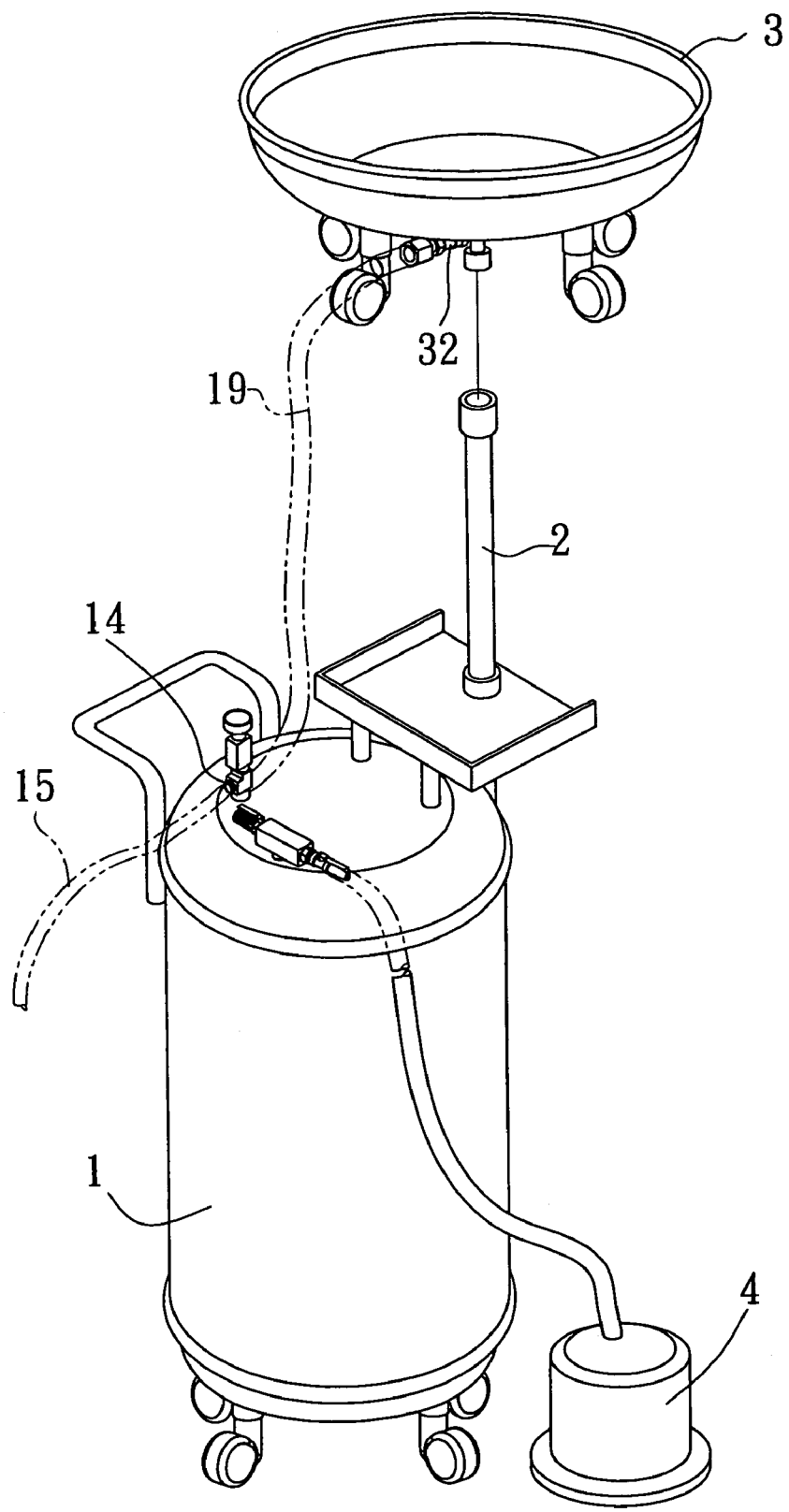
FIG. 6 is a perspective view of the second preferred embodiment of an oil change equipment in the present invention.

Referring to FIG. 6, which shows a second preferred embodiment in the present invention, the oil barrel 1 has only one oil outlet 14 instead of having two oil inlets. After the user supports the oil collecting pan 3 on top of the supporting rod 2 for receiving used oil drained from a small vehicle lifted off the ground, he should connect two ends of an oil conduit 19 to the oil inlet 14 and the pipe 32 communicating with the containing space in the oil collecting pan 3. After the oil collecting pan 3 is moved away from the supporting rod 2 for receiving used oil drained from a large vehicle, the user should connect an oil conduit 15, which is longer than the oil conduit 19, to the oil inlet 14 instead.

From the above description, it can be easily seen that when the oil change equipment of the present invention is used to receive drained used oil in oil change, the user won't have to move the oil collecting pan to the oil barrel or pour the used oil into the oil barrel after the used oil drips into the pan. In other words, there won't be possibility of drained used oil spilling out of the oil collecting pan to dirty the ground; used oil drained from a small vehicle lifted off the ground with a jack is allowed to flow into the oil barrel directly via the oil collecting pan supported on top of the supporting rod. And, used oil drained from a large vehicle also can be directly drawn into the oil barrel after the oil collecting pan is moved away from the supporting rod and supported on the casters, and after the vacuum oil-pumping device is activated.

What is claimed is:

1. An improvement on an oil change equipment, comprising an oil barrel; the oil barrel having a first oil inlet and a gate thereon; the oil barrel having a control valve securely joined to the gate;

a first oil conduit securely joined to the first oil inlet of the oil barrel at one end;

a supporting rod secured on top of the oil barrel; the supporting rod having a hollow seat at an upper end thereof;

an oil-collecting pan for receiving drained oil;

a pipe joined to a bottom of the oil collecting pan at one end; the pipe communicating with a containing space in the oil collecting pan; the pipe having a connecting pivot secured on a bottom side thereof; the pipe being connected to the oil inlet of the oil barrel at other end thereof for use as an oil passage between the oil collecting pan and the oil barrel; and a vacuum oil-pumping device connected to the control valve of the oil barrel;

whereby the oil collecting pan can be supported on the upper end of the supporting rod secured on top of the oil barrel with the connecting pivot being inserted in the hollow seat, thus allowing drained oil received with the oil collecting pan to flow into the oil barrel directly, and whereby the oil collecting pan can be positioned apart from the supporting rod.

2. The improvement on an oil change equipment as claimed in claim 1, wherein the oil barrel has a second oil inlet thereon, and a second oil conduit, which is shorter than the first oil conduit, is connected to the second oil inlet; the pipe being connected to the second oil conduit instead of the first oil conduit when the oil collecting pan is supported on the upper end of the supporting rod.

* * * * *